(12) United States Patent
Barth et al.

(10) Patent No.: US 6,630,269 B1
(45) Date of Patent: Oct. 7, 2003

(54) FUEL CELL

(75) Inventors: Thomas Barth, Darmstadt (DE); Klaus Kaspar, Oberkirch (DE); Birgit Severich, Viernheim (DE)

(73) Assignee: Firma Carl Freudenberg, Weinheim (DE)

( * ) Notice: Subject to any disclaimer, the term of this patent is extended or adjusted under 35 U.S.C. 154(b) by 0 days.

(21) Appl. No.: 09/700,001

(22) PCT Filed: Mar. 31, 1999

(86) PCT No.: PCT/EP99/02201

§ 371 (c)(1),
(2), (4) Date: Dec. 29, 2000

(87) PCT Pub. No.: WO99/60648

PCT Pub. Date: Nov. 25, 1999

(30) Foreign Application Priority Data

May 18, 1998 (DE) .......................... 198 21 976

(51) Int. Cl.[7] .............................. H01M 4/86; H01M 4/90
(52) U.S. Cl. .............................. 429/42; 429/41; 429/44; 429/30
(58) Field of Search ....................... 429/38, 39, 34, 429/30, 40, 42, 41, 44; 502/101

(56) References Cited

U.S. PATENT DOCUMENTS

| 4,759,989 A | 7/1988 | Abe et al. |
| 5,252,410 A | * 10/1993 | Wilkinson et al. ............ 429/26 |
| 5,292,600 A | 3/1994 | Kaufman |
| 5,304,330 A | * 4/1994 | Tatarchuk et al. .......... 264/104 |

FOREIGN PATENT DOCUMENTS

| DE | 195 44 323 | 6/1997 | |
| JP | 59141170 | * 8/1994 | ............ H01M/4/96 |
| WO | 94/09519 | 4/1994 | |

OTHER PUBLICATIONS

Von Klaus–Dieter Kreuer and Joachim Maier, "Physikalisch–chemische Aspekte von Festelektrolyt–Brennstoffzellen", *Spektrum der Wissenschaft*, Jul. 1995, pp. 92–96.

* cited by examiner

*Primary Examiner*—Patrick Ryan
*Assistant Examiner*—R Alejandro
(74) *Attorney, Agent, or Firm*—Kenyon & Kenyon

(57) ABSTRACT

A fuel cell, comprising a housing, at least one first proton-conducting layer covered by catalyst layers on both sides, gas-permeable electrodes on the catalyst layers and second layers arranged on both sides of the first layers, whereby said second layers take the form of electro-conductive plates that are located in closely adjacent electro-conductive contact with the electrodes, define gas conducting channels in conjunction with the electrodes and one layer touches the other layer by means of a substantially planar surface. The electrodes are made of at least one layer of electro-conductive polymer fibers that is intersected by flow channels running parallel to the surface thereof in at least one direction.

10 Claims, 1 Drawing Sheet

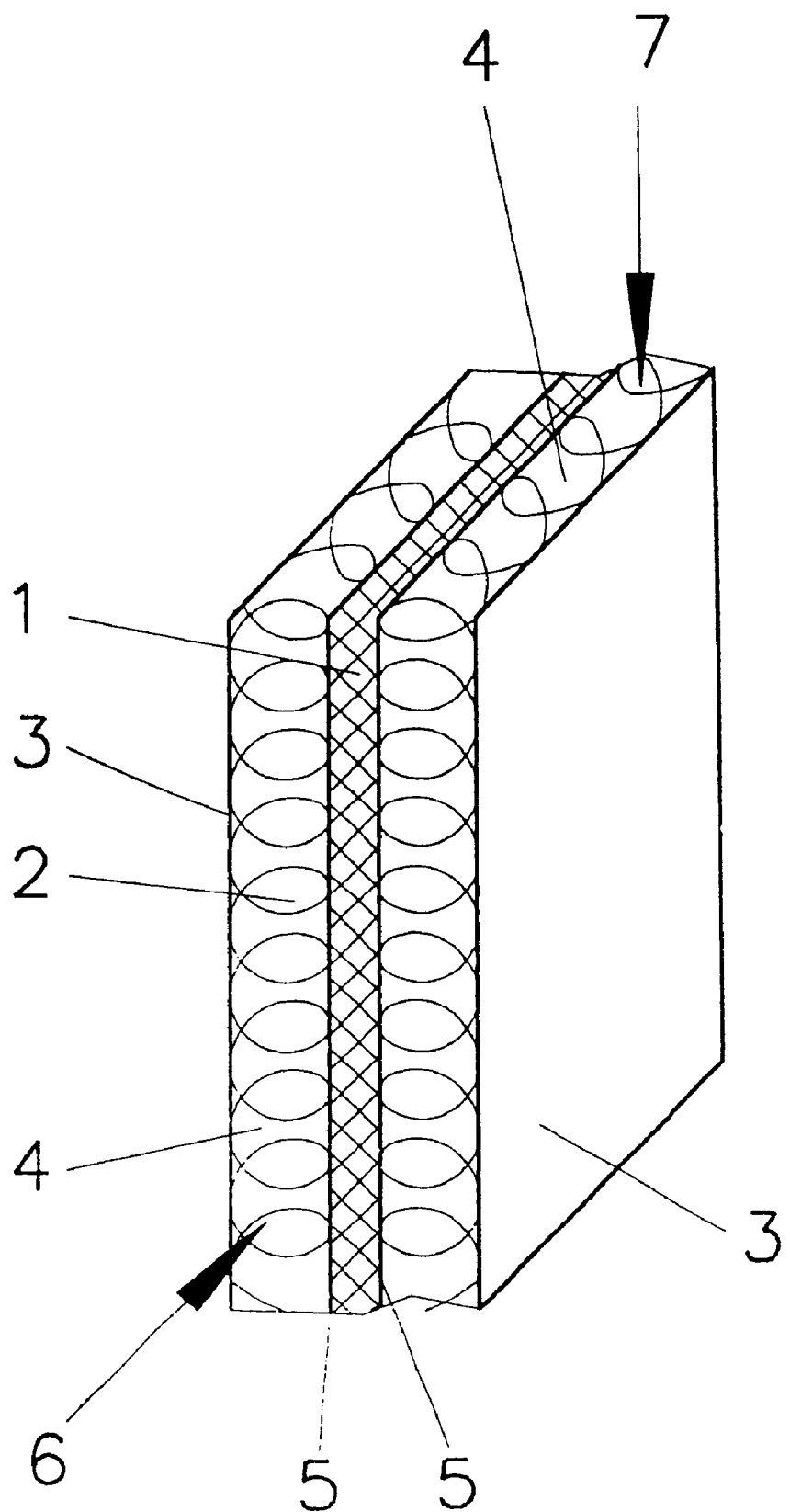

FUEL CELL

BACKGROUND OF THE INVENTION

The present invention relates to a fuel cell including a housing, at least one proton-conducting first ply, which is covered on both sides by catalyst plies, gas-permeable electrodes on the catalyst plies, and second plies in the form of electrically conductive plates arranged on the catalyst plies and on both sides of the first plies, which second plies are in electrically conductive contact with the electrodes in close proximity and delimit, together with the electrodes, gas-conducting channels, the first ply being in contact with the second ply with an essentially even surface.

Such a fuel cell is known from the journal Spektrum der Wissenschaft, July 1995, page 98. In this cell, the channels are molded into bipolar plates running parallel to one another. Therefore they are expensive and complicated to manufacture. The high weight/performance ratio of the known fuel cell is not fully satisfactory.

In fuel cells the ionic and electric paths are separated during the reaction between hydrogen and oxygen in order to obtain electrical energy from chemical energy.

The design and operation of different types of fuel cells are described by K.-D. Kreuer and J. Maier in Spektrum der Wissenschaft, July 1995, pp. 92–96.

The electrodes used in fuel cells must be very good electron conductors (electrical resistance around 0.1 $\Omega \cdot cm^{-1}$). In addition, they must not inhibit the chemical reaction. Furthermore they must be compatible with the electrolytes and the catalyst and must be chemically and physically inert, i.e., they must not enter into undesirable reactions with one another under the strongly oxidizing conditions at the cathode or the strongly reducing conditions at the anode.

In order to connect a plurality of cells to form cell stacks, the electrodes arranged between the first and second plies must have sufficient mechanical strength. Furthermore, material and process costs, service life, and environmental compatibility have an important role.

SUMMARY OF THE INVENTION

The object of the present invention is to provide a fuel cell of the type described above such that it can be industrially manufactured in a simpler and less expensive manner.

This object is achieved according to the present invention with a fuel cell of the type discussed above by providing that the electrode be formed of at least one layer of electrically conductive fibers made of polymeric material.

In the fuel cell according to the present invention, the electrodes are formed by at least one layer of carbonized fibers made of a polymeric material, traversed in at least one direction by flow channels running parallel to their surfaces.

The carbonized fibers are in contact with the catalyst plies, as well as the conductive plates in close proximity, which ensures proper removal of the electrons released during the intended application, as well as proper mechanical support for the first and second plies through one another. The thickness of the first and second plies can therefore be reduced resulting in considerable improvement in the weight/performance ratio compared to known fuel cells. A secondary result is the reduction of the volume required fore unit power generated. Therefore more fuel cells can be installed in a given space than previously, which is advantageous in automotive applications and improves overall available power output.

The fuel cell according to the present invention has design advantages in that it does not require that gas-conducting channels be formed using mechanical machining and subsequently sealing in a complicated manner; in the fuel cell according to the present invention all plies may have an even design in the simplest case, which considerably simplifies manufacturing and sealing and provides the additional advantage that the first ply is available almost in its entirety for proton conduction and the second ply is entirely available for electron removal.

It has been proven advantageous if the layer forming the electrodes is made of nonwoven, woven, or knitted fabric. The fibers should have a titer of 10 to 15 dtex, preferably 15 to 35 dtex. The layer preferably has an overall weight per surface area of 15 to 250 $g/m^2$ to for a thickness of 1 to 6 mm.

The layer may have a multi-ply structure similar to that of corrugated paper and may have at least one central support ply having an open structure between two cover plies of a higher density for optimally performing different functions. One of these functions may be to provide optimum support of the proton-conducting first ply, for which contact points in close proximity from one another seem to be advantageous. The second function is to provide optimum removal of the electrons generated during the intended application via the conductive plates, and the third function may be optimum exposure of the first ply to the operating gases needed during the intended application, while avoiding an unnecessary pressure drop, which requires, among other things, the electrodes facilitate the flow parallel to their surfaces; in particular, a design in which the fibers forming the support ply are arranged essentially perpendicular to the cover plies performs these functions particularly well. The fibers may also be arranged in the path of the gases enclosed in channels and be formed, for example, by warp stitch joints or by separately produced filaments which are introduced in the gap between the cover plies and optionally bonded thereto. The fibers forming the electrodes are preferably made of an electrically conducting polymeric material such as, for example, carbonized polyacrylnitrile or pitch. Metals can also be used. The fibers may have a smaller diameter in the area of the cover plies then in the area of the support ply in order to achieve optimum electron conductivity with the least possible resistance to flow.

BRIEF DESCRIPTION OF THE DRAWING

The drawing shows a fuel cell in a perspective top view, the housing having been omitted for greater clarity.

DETAILED DESCRIPTION

The fuel cell has a proton-connecting first ply 1, covered on both sides by catalyst plies 5. On the surfaces of catalyst plies 5 facing outward there are gas-permeable electrodes 2 which are in contact, on their sides facing away from catalyst plies 5, with second plies 3 in the form of electrically conductive plates.

The first ply may be entirely made of a proton-conductive polymeric material, however also of a porous sheet, a woven or knitted fabric or a nonwoven made of short or continuous fibers, soaked to saturation in a perfluorinated ionomer, the perfluorinated ionomer being a polytetrafluoroethylene with sulfonated perfluorvinyl ether side chains. As an alternative, the microfiber nonwoven can be soaked in a 1 to 5 molar aqueous sulfuric acid solution or concentrated phosphoric acid. Furthermore, hydrated zirconium phosphate or ammonium dihydrogen phosphate can also be used.

The efficiency of the fuel cell can be improved with decreasing thickness of the first ply. From this point of view it has been shown to be advantageous if a nonwoven contained in the first ply is made of microfibers, film fibrils, or microfilaments. The use of porous sheets is, however, also possible. In particular, PTFE and polysulfone have also been successfully used.

In using a microfiber nonwoven as a proton conductor, the nonwoven is soaked to saturation in an electrolyte; the microfiber nonwoven is chemically inert with respect to the electrolyte at temperatures up to +200° C. under both oxidizing and reducing conditions, the weight of the microfiber nonwoven being 20 to 200 g/m$^2$; the maximum thickness of the nonwoven is 1 mm and pore volume is 65 to 92%.

The average pore radius of the microfiber nonwoven should be between 20 nm to 210 μm.

Second plies 3 have an even design. They are formed by sheet metal plates.

Electrodes 2 are arranged between catalyst plies 5 covering the first ply on both sides and the sheet metal plates forming plies 3; each electrode 2 is formed by a layer of carbonized polyacrylnitrile fibers which are traversed in a plurality of directions by channels 4 running parallel to their surfaces. The layers are made up of nonwoven materials made of carbonized polyacrylnitrile fibers having a titer of 35 dtex. They have a thickness of 4 mm and the weight per unit surface of 180 g/m$^2$. Both layers have a multi-ply design and include an open-structured support ply between two cover plies of a higher density, the fibers of the support ply being arranged essentially perpendicularly to the cover plies. The operating gases passing through the system during the intended application can therefore flow through the channels without the noticeable pressure drop. The fibers extending across the direction of flow effect, however, some turbulence in the operating gases whereby unconsumed gas components become attached again to first ply 1 or catalyst plies 5 that cover it. This is highly advantageous for-achieving proper energy efficiency.

The plies contained in both layers are permanently bonded, which considerably facilitates manufacturing. Like first ply 1 and third plies 3, the layers have an even design and are inserted in the gaps between first ply 1 and third plies 3, so that an electrically conductive connection between them is obtained. All plies must be inserted into the housing, which is not shown in the drawing, so that reaction gases 6, 7 passing through the individual layers can react with one another only after the reaction on the catalyst surface through ply 1 made of proton-conducting polymeric material, rather than directly. First ply 1 and third plies 3 may engage electrodes 2 in all directions in the area of the narrow edge strips for this purpose; these edge strips, together with the sealing strips to of the housing, then form a seal. This can prevent, at a relatively low cost, operating gases 6, 7 from entering into a reaction with one another directly, bypassing first ply 1. This is highly advantageous from the safety point of view.

The fuel cell according to the present invention is characterized by a simple design and inexpensive availability through a particularly high operating reliability and favorable weight/performance ratio. This is highly advantageous for applications in the automotive industry.

What is claimed is:

1. A fuel cell comprising:
   a housing;
   at least one proton-conducting first ply having sides, and which is covered by catalyst plies on both of its sides;
   gas-permeable electrodes on the catalyst plies;
   second plies in the form of electrically conductive plates arranged on both sides of the first plies, which contact the electrodes in an electrically conductive manner and delimit, together with the electrodes, gas-conducting channels, at least one if the first and second plies having an essentially planar surface, and the electrodes being formed, through at least one layer, by electrically conductive fibers having a titer of 10 to 50 dtex made of a polymeric material, which are traversed in at least one direction by flow channels running parallel to their surfaces, wherein the layer has a multi-ply structure and includes at least one open-structured support ply between two covering plies with the covering plies having a higher density than the open-structured support ply.

2. The fuel cell according to claim 1, wherein the layer is formed by one of a nonwoven, woven, and knitted fabric.

3. The fuel cell according to claim 2, in which the layer is made of polymeric fibers and wherein the layer has a weight per unit surface of 50 to 250 g/m$^2$ for a thickness of 2 to 6 mm.

4. The fuel cell according to claim 1, in which the fibers have a titer of 15 to 35 dtex.

5. The fuel cell according to claim 1, wherein the fibers forming the support ply are arranged essentially perpendicularly to the cover plies.

6. The fuel cell according to claim 1, wherein the fibers are arranged in a path of any gases enclosed in channels.

7. The fuel cell according to claim 1, wherein the layer contains fibers made of carbonized polyacrylnitrile, metal, and/or pitch.

8. The fuel cell according to claim 1, wherein the layer contains fibers made of carbonized polyacrylnitrile, metal, and/or pitch.

9. A fuel cell comprising:
   a housing;
   at least one proton-conducting first ply having sides, and which is covered by catalyst plies on both of its sides;
   gas-permeable electrodes on the catalyst plies;
   second plies in the form of electrically conductive plates arranged on both sides of the first plies, which contact the electrodes in an electrically conductive manner and delimit, together with the electrodes, gas-conducting channels, at least one of the first and second plies having an essentially planar surface, and the electrodes being formed, through at least one layer, by electrically conductive fibers having a titer of 10 to 50 dtex made of a polymeric material which are traversed in at least one direction by flow channels running parallel to their surfaces, wherein the layer has a multi-ply structure and includes at least one open-structured support ply between two covering plies with the covering plies having a higher density than the open-structured support ply, and wherein the layer is formed by one of a nonwoven, woven, and knitted fabric.

10. The fuel cell according to claim 9, wherein the fibers forming the support ply are arranged essentially perpendicular to the cover plies.

\* \* \* \* \*